United States Patent [19]
Aburomia

[11] Patent Number: 5,426,681
[45] Date of Patent: Jun. 20, 1995

[54] BOILING WATER REACTOR WITH COMBINED ACTIVE AND PASSIVE SAFETY SYSTEMS

[75] Inventor: Momtaz M. Aburomia, Palo Alto, Calif.

[73] Assignee: General Electric Company, Schenectady, N.Y.

[21] Appl. No.: 177,022

[22] Filed: Jan. 4, 1994

[51] Int. Cl.6 .............................................. G21C 15/18
[52] U.S. Cl. .................................... 376/283; 376/282; 376/299
[58] Field of Search ............... 376/282, 283, 293, 298, 376/299

[56] References Cited

U.S. PATENT DOCUMENTS

| | | | |
|---|---|---|---|
| 3,899,391 | 8/1975 | Sulzer et al. | 376/283 |
| 4,808,369 | 2/1989 | Yamanari et al. | 376/282 |
| 4,818,475 | 4/1989 | Gluntz et al. | 376/282 |
| 4,830,815 | 5/1989 | Gluntz | 376/299 |
| 5,049,353 | 9/1991 | Conway et al. | 376/299 |
| 5,059,385 | 10/1991 | Gluntz et al. | 376/282 |
| 5,080,857 | 1/1992 | Miller et al. | 376/280 |
| 5,082,619 | 1/1992 | Sawyer | 376/282 |
| 5,102,617 | 4/1992 | Gluntz et al. | 376/283 |
| 5,120,494 | 6/1992 | Nazareno et al. | 376/282 |
| 5,154,876 | 10/1992 | Ehrke et al. | 376/282 |
| 5,272,737 | 12/1993 | Fujii et al. | 376/283 |

OTHER PUBLICATIONS

Vierow et al., "BWR Passive Containment Cooling System by Condensation Driven Natural Circulation" (5 pages) (no date).
Nagasaka et al., "Heat Removal Tests of Isolation Condenser Applied as a Passive Containment Cooling System" (7 pages) (no date).

*Primary Examiner*—Daniel D. Wasil
*Attorney, Agent, or Firm*—James E. McGinness

[57] ABSTRACT

A boiling water reactor having an optimum combination of active and passive safety systems. By combining three active divisions (I,II,III) of the boiling water reactor with a passive fourth division, the resulting design achieves improved plant reliability in addition to on-line maintenance of the emergency core-cooling systems. Included in the passive division is a new component, the reactor heat removal condenser (48), to be used in conjunction with pressure release valves (50) to provide backup depressurization of the reactor pressure vessel and backup heat removal and inventory control. The operating pressure of the heat removal condenser is maintained in the range of 100-200 psi.

12 Claims, 6 Drawing Sheets

BOILING WATER REACTOR WITH COMBINED ACTIVE AND PASSIVE SAFETY SYSTEMS

FIELD OF THE INVENTION

This invention relates generally to protection systems for shutting down a boiling water reactor (BWR) and maintaining it in a safe condition in the event of a system transient or malfunction that might cause damage to the nuclear fuel core, most likely from overheating. In particular, the invention relates to emergency core-cooling systems (ECCS) for supplying water to the reactor core and containment systems for containing steam and radioactivity escaping from the reactor pressure vessel (RPV) in the event of a loss-of-coolant accident (LOCA) in a BWR.

BACKGROUND OF THE INVENTION

BWRs have conventionally utilized active safety systems to control and mitigate accident events. Those events varied from small break to design base accidents. Active systems, consisting of both high-pressure and low-pressure pumping equipment, have been the corner-stones of BWR/4 to BWR/6 safety systems product lines. A fully active three-division concept with N+1 capability (i.e., the capability to meet safety requirements despite one disabled division) is incorporated in the Advanced Boiling Water Reactor (ABWR).

One alternative to the three active divisions concept is to use four active divisions. The four active divisions concept adds both more ECCS systems and supporting auxiliary systems, which require more maintenance to be performed. This is counter to the objective of reducing maintenance and improving safety.

Another alternative to the three active divisions concept is to use passive systems. Totally passive safety systems have been studied for use in BWRs because of their merits in reducing maintenance and surveillance testing of the safety-related equipment, and in eliminating the need for AC power, thereby improving the reliability of BWR operation and safety. Simplified BWRs (SBWRs) have been designed with totally passive safety features that provide more resistance to human error in accident control and mitigation.

There are, however, some tradeoffs when employing totally passive safety systems in BWRs. Due to their passive nature, the totally passive system—when designed in accordance with nuclear standards of system separation and diversity—would substantially add to plant size and cost. Therefore passive system applications to BWRs have been limited to small- and medium-sized plants having up to about 1000 MWe output.

SUMMARY OF THE INVENTION

The present invention is an improved system which combines the advantages of active and passive cooling systems. This invention combines active and passive systems in a single design that meets the safety requirements for BWRs. In addition, the design allows for a safety division out of service for on-line maintenance of the safety equipment during plant operation (N+2 capability).

The preferred embodiment of the invention combines three active divisions with a passive fourth division to provide the N+2 capability. In accordance with the invention, an ECCS network is provided which has three active divisions (Divisions I through III) and a passive fourth division (Division IV). The selection of the fourth division to be passive provides diversity in systems and power supply with a resulting increase in plant reliability. The passive system also contains fewer parts so it provides the N+2 capability without a large increase in maintenance. From the licensing standpoint, a design with three active divisions and one passive division contains, at a minimum, the safety elements of the ABWR while introducing the passive features of the SSWR.

The active systems include the traditional high-pressure and low-pressure safety systems that derive their power source from either reactor steam or from off-site AC power backed by on-site diesel generator power. The design of the active system divisions is similar to the known ABWR design.

The passive division in accordance with the present invention derives its power supply from the plant battery bus. This division (as described herein) incorporates the following passive equipment: a gravity-driven cooling system (GDCS) for both short- and long-term reactor inventory supply; a primary containment cooling system (PCCS); a reactor heat removal condenser (RHR-CND) as a backup for the active reactor heat removal heat exchanger (RHR-HX) coupled to the suppression pool (SP), and the release valves (RLVs) connecting the RHR-CND to the RPV. Both the PCCS and RHR-CND are located in the condenser pool above the drywell.

Multiple benefits accrue from combining the active and passive safety system divisions in a single design. First, the resulting system combines the individual merits of the active and passive systems. Second, the passive systems carry the load in the event that active systems are rendered inoperative and also share the load under plant degraded conditions. Therefore the passive systems serve the function of backing up the active systems. Third, the resulting design is feasible because it is based on the experience gained in the ABWR and SBWR designs. Lastly, the resulting reliability of the active/passive design concept is higher than the purely active concept of the ABWR.

A BWR design combining the active safety systems of the ABWR with the passive safety features of the SBWR offers a new approach in combining the merits of both designs to provide diversity in core cooling, inventory makeup, depressurization and ultimate heat sink. In addition, the combined active/passive safety system of the invention provides increased plant reliability because of the diversity offered by the passive fourth division.

The passive fourth division of the invention in turn incorporates a new system, the RHR-CND, which is used in conjunction with RLVs to provide backup depressurization of the RPV and backup heat removal and inventory control for events such as station blackout and reactor isolation. This is a medium-pressure system which is unique in operation compared to past isolation condenser (high pressure) and passive containment cooling (low pressure) systems.

To improve plant availability and utilization of manpower, on-line maintenance is considered desirable for the ECCS network. By making the fourth division passive, on-line maintenance can be achieved without increasing the number of diesel generators, service systems and component cooling water systems.

DETAILED DESCRIPTION OF THE PREFERRED EMBODIMENTS

Figure 1:
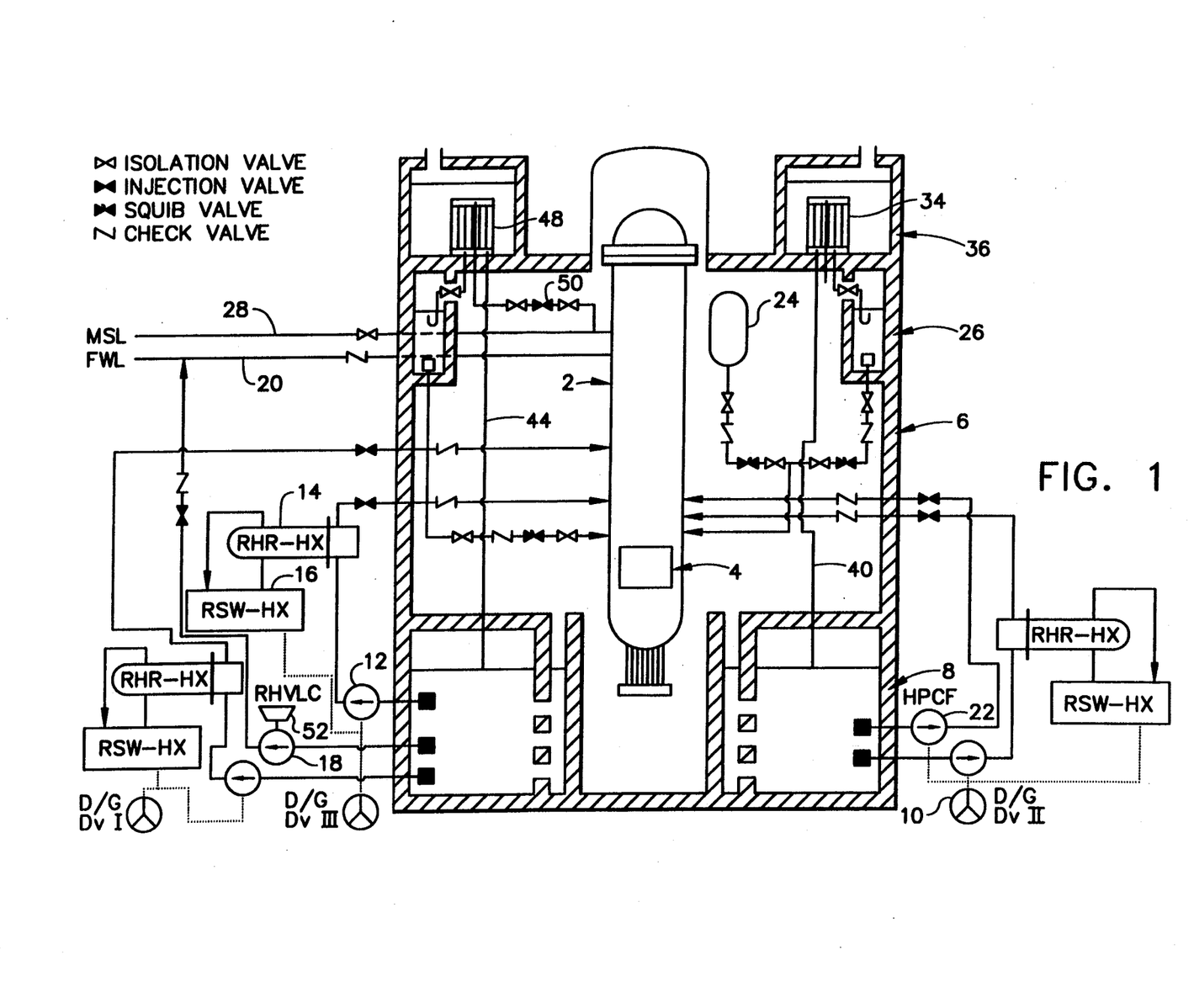
FIG. 1 is a simplified schematic depiction of a nuclear reactor system having a combined active/passive safety system in accordance with a preferred embodiment of the invention.

The combined active/passive ECCS network having three active divisions and one passive division in accordance with a preferred embodiment of the invention is depicted in FIG. 1. The active components are primarily those of the ABWR with either a reactor core isolation cooling (RCIC) or a reactor heat vent and level control (RHVLC) and with either one or two high-pressure core flooder (HPCF) units. The high-pressure active components for the configuration evaluated are not needed to satisfy the design basis requirements. Therefore, the high-pressure units can be classified as non-safety in the three active divisions and fourth passive division concept in accordance with the invention. However, retaining the HPCF system in Division III will result in a lower core damage frequency. For this case, the number of active components in the active/passive system will be the same as in the ABWR. Alternatively, it would be possible to apply the combined active/passive ECCS network using the ABWR ECCS active safety systems. In this case, consideration for a third safety-related HPCF and non-safety classification for the RCIC can be entertained depending on the desire or need to perform on-line maintenance of the high-pressure ECCS equipment.

As shown in FIG. 1, each active division (Divisions I to III) has a low-pressure flooder (LPFL) comprising a diesel generator 10 which drives a pump 12. Pump 12 pumps water from the suppression pool 8 to the RPV 2 via a reactor heat removal heat exchanger (RHR-HX) 14. Each RHR-HX is in turn coupled to the ultimate sink (e.g., seawater, riverwater or cooling pond) by an intermediate heat exchanger (RSW-HX) 16. Each RSW-HX pump (not shown) is also driven by a respective diesel generator 10. The RHR-HX/RSW-HX pairs combine to remove heat from the water supplied to the RPV from the suppression pool. The LPFL also operates in other modes: (1) means (not shown) are provided for water from the RHR-HX to be piped back to the suppression pool in a pool cooling mode; (2) the RHR-HX is connected to a drywell sparger (not shown) for spraying cooling water into the drywell when the drywell temperature is too high; and (3) the RHR-HX is connected to a wetwell sparger (not shown) for spraying cooling water above the suppression pool when the wetwell temperature is too high.

Division I of the active system further includes a reactor heat vent and level control (RHVLC) which comprises a high-pressure pump 18 which is powered by the steam turbine 52. The RHVLC pumps water from the suppression pool to the feedwater line 20, which carries the water to the RPV. RHVLC turbine 52 also drives a generator (not shown) which is used to recharge the batteries. Alternatively, a conventional RCIC steam turbine system could be used.

Division II of the active system further includes a high-pressure core flooder (HPCF) 22, which comprises a high-pressure pump driven by a diesel generator. HPCF 22 pumps water from the suppression pool to RPV 2 via an injection line.

The passive division components include the GDCS, the PCCS, the RHR-CND and the release valves. Each of these systems will be described in detail below.

The GDCS provides reactor vessel inventory to the annulus region of the reactor after a LOCA and reactor depressurization. The GDCS is composed of a short-term pressurized subsystem (GDCS-ST) 24, which is responsible for filling and reflooding the core following a LOCA, and a long-term subsystem (GDCS-LT) 26, which provides long-term reactor inventory supply following discharge of the GDCS-ST. Both subsystems provide cooling water under force of gravity from water pools located within the drywell at an elevation above the active core region to replace RPV water inventory lost during a LOCA event and subsequent decay heat boil-off. The GDCS-ST provides short-term water makeup; the GDCS-LT provides long-term post-LOCA reactor vessel inventory makeup to meet long-term core decay heat boil-off requirements.

Figure 5:
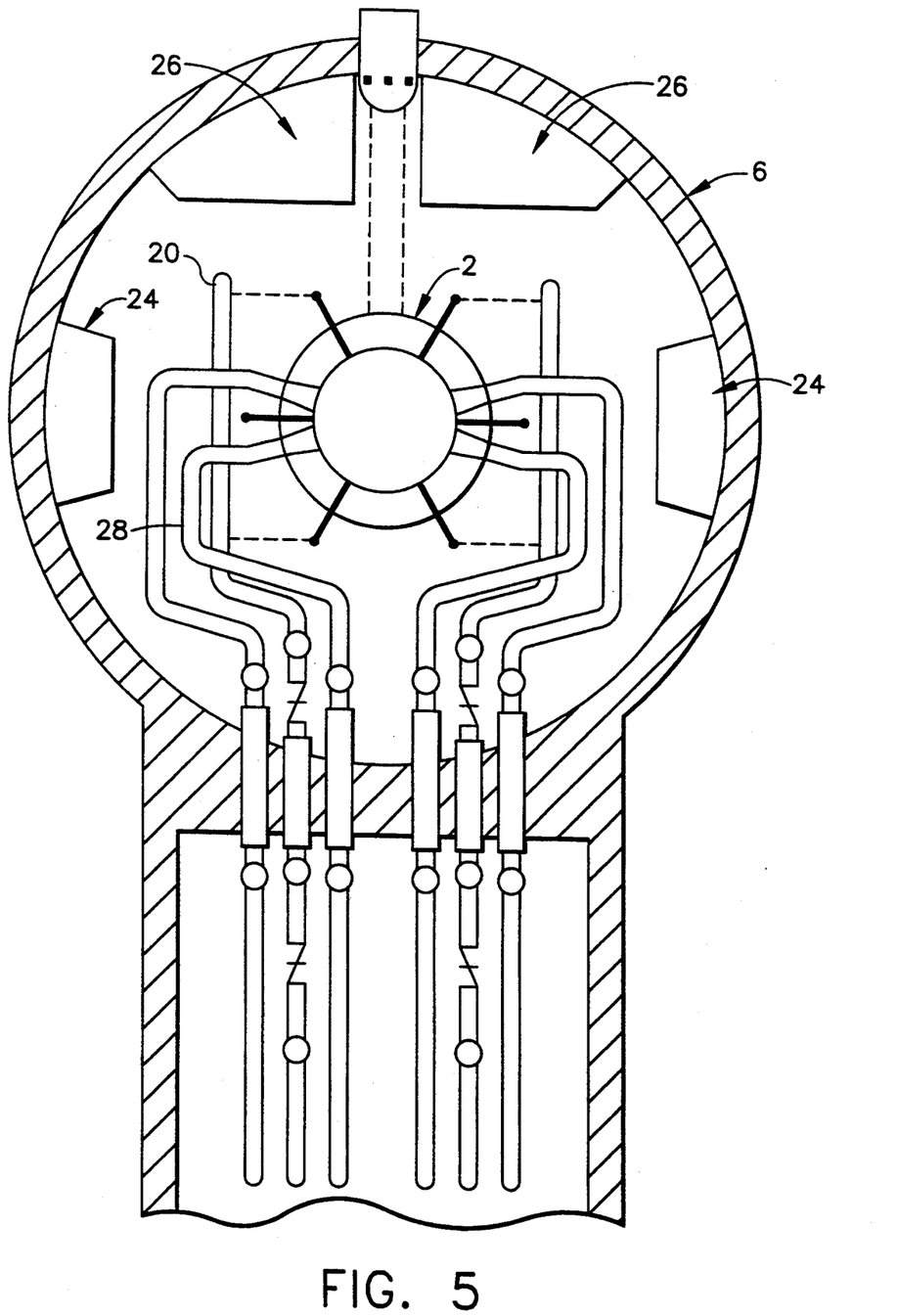
FIG. 5 is a simplified schematic depiction of the arrangement of the gravity-driven cooling system within the primary containment vessel in accordance with the invention.

The GDCS-ST 24 may consist of one tank (as shown in FIG. 1) or two or more tanks (as shown in FIG. 5) located between the suppression pool and the condenser pool. The GDCS-ST and GDCS-LT are both placed in the PCV 6 at the same regional elevation of the main steam line 28. FIG. 5 shows the arrangement in PCV 6 of a GDCS having two GDCS-LT tanks and two GDCS-ST tanks, where access is provided between the GDCS-ST tanks for removal or entry of equipment from or into the drywell 11.

Figure 2:
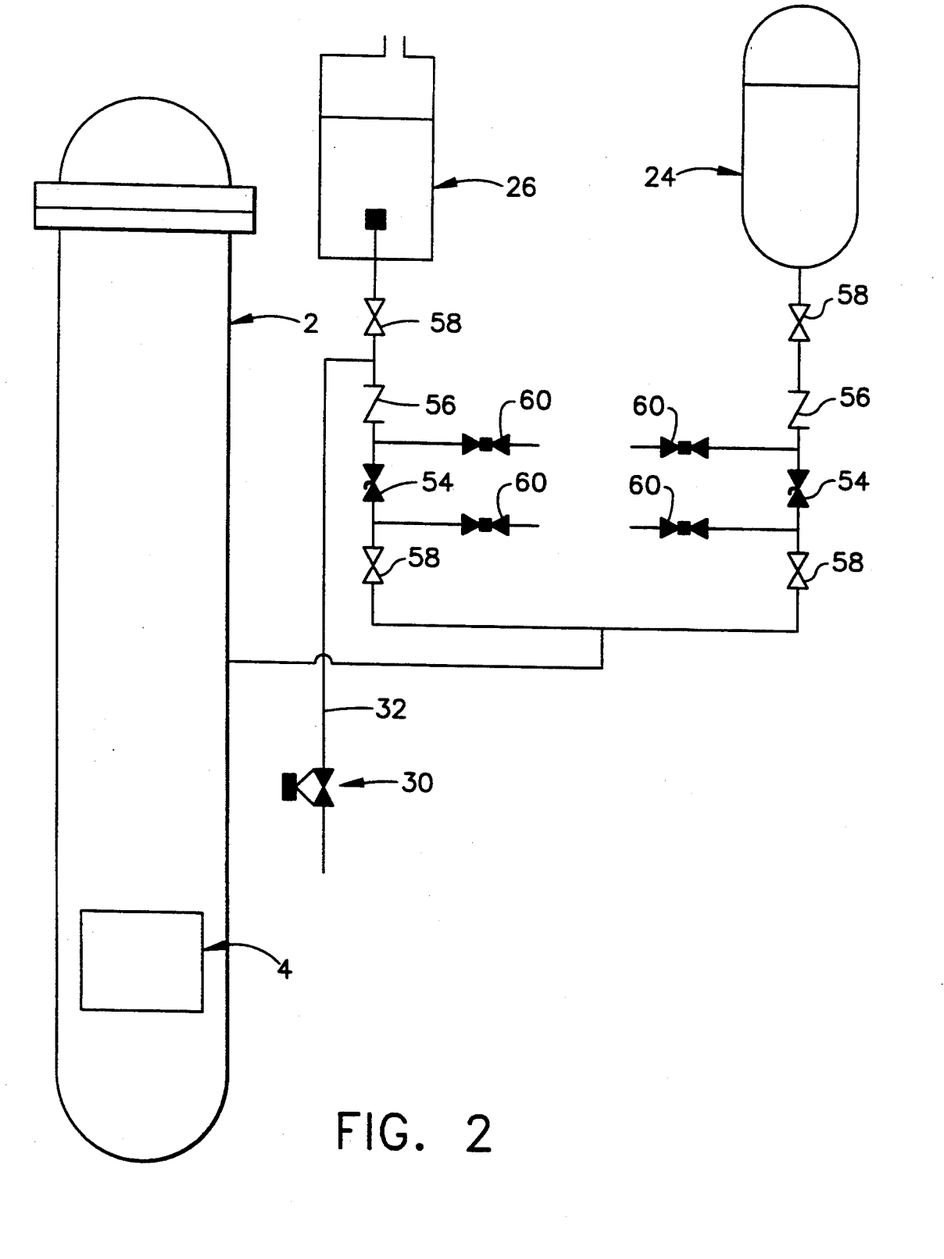
FIG. 2 is a simplified schematic depiction of a gravity-driven cooling system incorporated in the combined active/passive safety system of the invention.

The GDCS-ST 24 (as shown in FIG. 2) is slightly pressurized at 100 psia and is initiated by a low reactor water level signal. This subsystem operates following reactor depressurization. A time delay is provided for the opening of the squib valves 54 in the line from the GDCS-ST pool after a Level 1 signal is received. A check valve 56 is provided in the line leading to the RPV to eliminate any backflow from the RPV to the GDCS-ST tank. The GDCS-ST tank has a sufficient supply of water to flood the RPV to a depth above the fuel rods.

The GDCS-LT 26 consists of two tanks which supply reactor water after a time delay of approximately ½ to 3 hr after the initial low-level signal is received, at which time the GDCS-LT squib valves 54 are fired electrically to open. Upon opening of the squib valves, the gravity head causes water from the GDCS pools to flow into the RPV 2.

An additional valve in the GDCS line is called a thermal-actuated deluge valve 30. This valve opens when the temperature in the lower drywell rises above a predetermined threshold, resulting in water from the GDCS-LT filling the lower drywell cavity surrounding the RPV.

The GDCS-ST and GDCS-LT supply water to the RPV by way of two nozzles on the vessel. Each RPV injection line nozzle contains a flow limiter (not shown) of a venturi-like shape. On each injection line there is a locked-open, manually operated isolation maintenance valve 58 located near the vessel nozzle and another such valve located near the water source. A test connection valve 60 downstream of the check valve allows the latter to be tested during refueling outages.

In each GDCS injection line, a check valve 56 is located upstream of squib valve 54. The squib valve is designed to withstand reactor pressure without leakage during operation. Once RPV Level 1 is reached, vessel depressurization is initiated and timers are started in GDCS logic which will actuate the squib valves. Once actuated, the squib valves provide a permanent open flow path from the GDCS source to the RPV.

The check valves prevent backflow to the pools after the squib valves are actuated and the vessel pressure is still higher than the pool pressure plus its gravity head. Once the vessel pressure has decayed below the pool pressure, the differential pressure will open the check valve and allow water to begin flowing into the vessel. The check valves are designed such that they remain partially open when zero pressure difference exists across the valve. This minimizes the potential for sticking in the closed position during long periods of nonuse.

Pool suction lines have an intake strainer (not shown) to prevent entry of debris material that might be carried into the pool, such as during a large break LOCA. The thermally actuated deluge valves are connected respectively to two GDCS-LT downcomer lines 32, which provide a means to flood the lower drywell cavity in the event of a core melt sequence that causes failure of the lower vessel head and allows molten fuel to reach the cavity floor.

Figure 3:
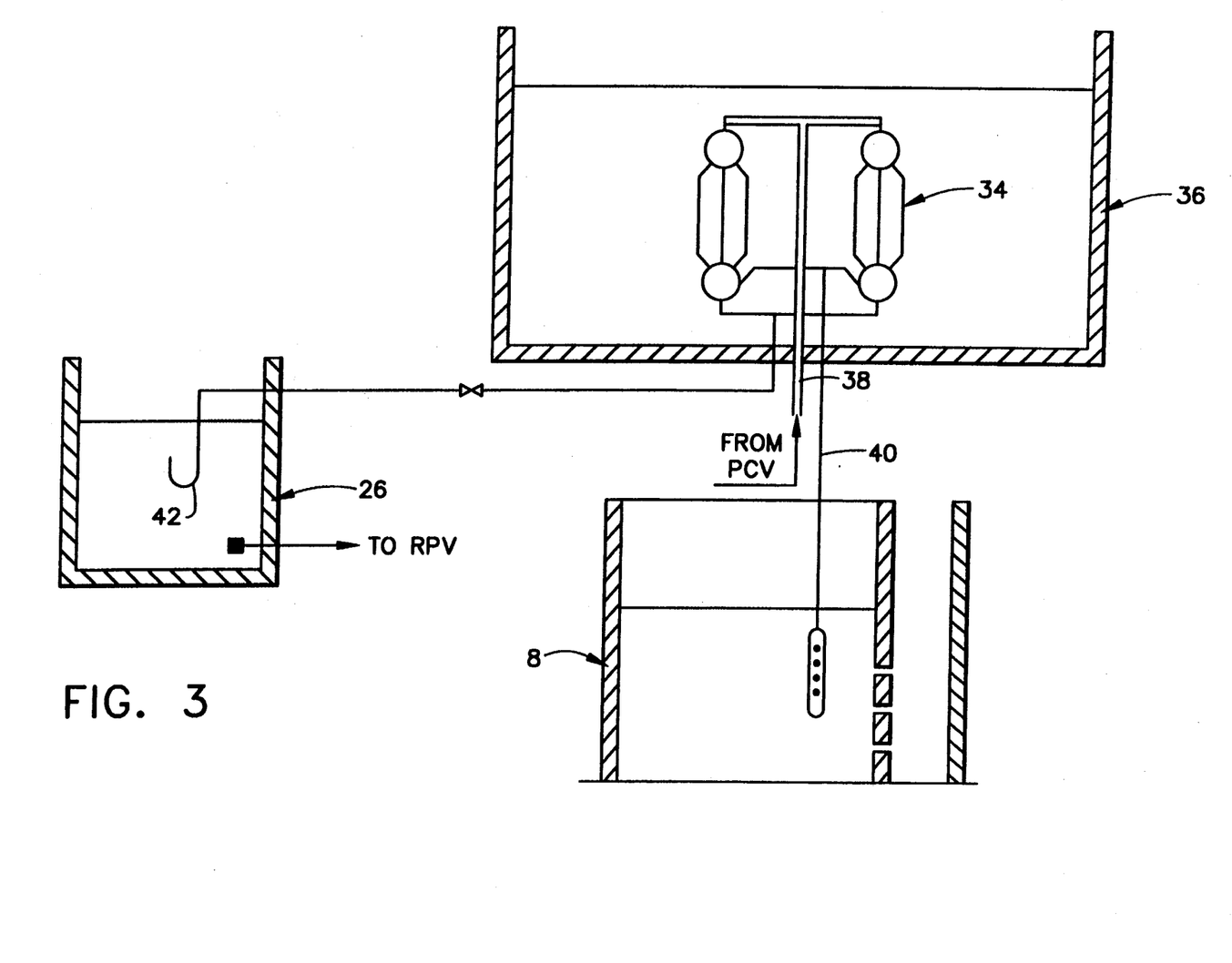
FIG. 3 is a simplified schematic depiction of a primary containment cooling system incorporated in the combined active/passive safety system of the invention.

The PCCS 34 (as shown in FIG. 3) maintains the containment 6 within its pressure limits for design basis accidents. The system is designed as a passive system with no components that function actively, and it is also designed for conditions that equal or exceed the upper limits of containment reference severe accident capability. The PCCS operates by natural circulation. The PCCS is initially driven by the pressure difference created between the containment drywell and the suppression pool during a LOCA and then by gravity drainage of steam condensed in the tubes, so they require no sensing, control, logic or power-actuated devices to function. The PCCS is an extension of the safety-related containment and has no isolation valves.

The PCCS consists of two low-pressure, totally independent loops, each loop containing a heat exchanger that condenses steam and transfers heat to water in a large condenser pool which is vented to atmosphere. Each PCC condenser (as well as each RHR-CND) is submerged in a respective compartment of the condenser pool 36 (see FIG. 6) located high in the reactor building at approximately the same elevation as the fuel pools. The condenser pool is above and outside of the drywell (see FIG. 1). A combination of one PCCS unit and one RHR-CND unit is designed to discharge into a single GDCS-LT unit. The suppression pool may be connected to the GDCS-LT pool via the LPFL pumps 12 for replenishing the gravity-driven water supply from the suppression pool.

Each PCC condenser (one of which is shown in FIG. 3) has an upper drum and a lower drum connected by condenser tubes. A steam-gas mixture enters the PCCS through a line 38 directly from the drywell, so that no valves need be opened and the PCCS is always in a "ready standby" mode. The steam is then condensed in the condenser tubes and falls to the lower drum. From the lower drum, the noncondensables can be vented through a line 40 which is submerged in the suppression pool 8. The condensed water is drained to the GDCS-LT pool 26. A U-shaped bend 42 in the pipeline in the GDCS-LT pool is provided to form a water trap that prevents steam from entering the PCCS condenser from the GDCS pool airspace.

Heat from the PCCS condenser will cause the condenser pool temperature to rise to a point where it will boil. The resulting steam will vent outside the reactor building. A continuous circulation of steam entering the PCCS condenser, being condensed and flowing to the GDCS-LT pool, is established to remove containment heat. A GDCS line, which is part of the GDCS system, is shown in FIG. 3 connecting the GDCS-LT pool to the RPV. This line is included as part of FIG. 3 to show the capability for the condensed PCCS water that enters the GDCS-LT pool to subsequently return to the RPV.

The two PCC condensers are made of two identical modules. The two condensers provide containment cooling after a LOCA and limit containment pressure to less than its design pressure for at least 72 hours after a LOCA.

The PCCS condenser has a central steam supply pipe which is open to the containment at its lower end and which feeds two horizontal headers through two branch pipes at its upper end. Steam is condensed inside vertical tubes and the condensate is collected in two lower headers. The vent and the drain lines from each lower header are routed to the drywell through a single containment penetration. The condensate drains into an annular duct around the vent pipe and then flows in a line which connects to a large common drain line which also receives flow from the other header.

Figure 6:
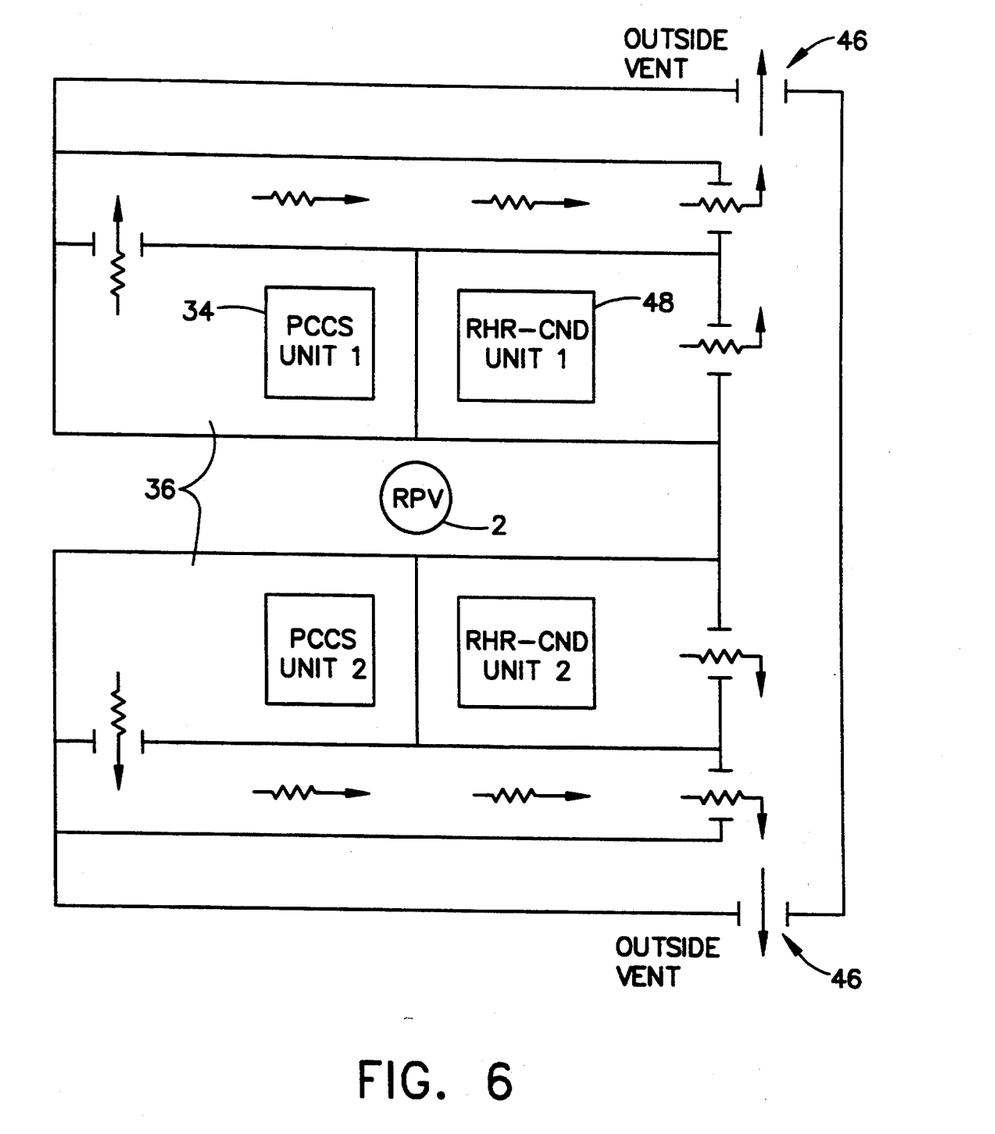
FIG. 6 is a concept diagram showing the arrangement of the primary containment cooling system and the reactor heat removal condenser above the drywell in accordance with the invention.

As seen in FIG. 6, each condenser is located in a respective subcompartment of the condenser pool 36, and all pool subcompartments communicate at their lower ends to enable full utilization of the collective water inventory, independent of the operational status of any given subloop. A valve is provided at the bottom of each condenser pool subcompartment that can be closed so the respective subcompartment can be emptied of water to allow condenser maintenance.

Condenser pool water can heat up to about 101° C. (214° F.). The steam which is formed, being nonradioactive and having a slight positive pressure relative to station ambient pressure, is vented from the steam space above each PCC condenser segment. The steam is released to the atmosphere through large-diameter discharge vents 46. A moisture separator is installed at the entrance to the discharge vent lines to preclude excessive moisture carryover and loss of condenser pool water.

Condenser pool make-up clean water supply for replenishing the level is provided from a so-called "make-up demineralized system" (not shown). Level control is accomplished by using an air-operated valve in the make-up water supply line. The valve opening/closing is controlled by a water level signal sent by a level transmitter sensing water level in the condenser pool.

Cooling/clean-up of the condenser pool water is performed by a fuel and auxiliary pools cooling system (not shown). Several suction lines, at different locations, draw water from the sides of the condenser pool at an elevation above the minimum water level that is required to be maintained during normal plant operation. The water is cooled/cleaned and then returned to the condenser pool. On the return line for condenser pool water recirculation flow, there is also a post-LOCA pool water make-up connection.

Figure 4:
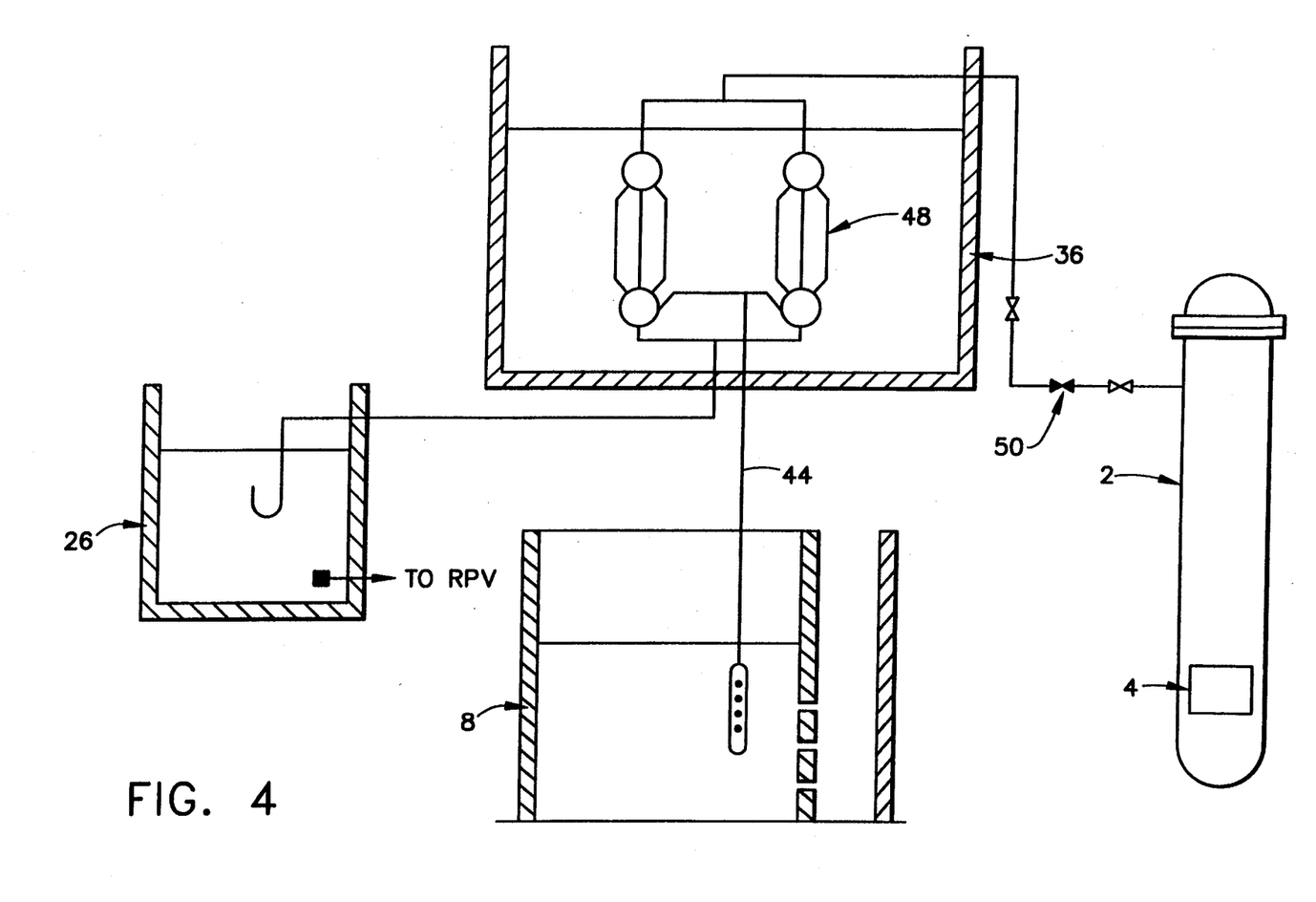
FIG. 4 is a simplified schematic depiction of a reactor heat removal condenser and a release valve incorporated in the combined active/passive safety system of the invention.

As seen in FIG. 6, the passive division incorporates a pair of RHR condensers 48 located in respective subcompartments of the condenser pool. One such RHR-CND is illustrated in FIG. 4. Operation of the RHR-CND is initiated by opening the associated release valve 50 connected to the main steam line 28 from the RPV. When release valve 50 is opened, the difference between the pressure in RPV 2 and the pressure in the associated GDCS-LT tank 26 forces the steam flow from the RPV to the RHR-CND. This steam is condensed in the condenser tubes and then the condensate is returned to the GDCS-LT pool 26. The steam condensation heats the condenser pool 36 to the boiling point, producing nonradioactive steam which is vented outside the reactor containment building. With the low-pressure GDCS-LT system connected downstream to RHR-CND 48, the operating pressure of RHR-CND 48 will be in the low to intermediate range (i.e., 100–200 psi). The pressure drop across the RHR-CND is of the order 10–30 psi at full capacity. The RHR-CND can be classified as non-safety, and the unit operation is designed for emergencies involving multiple failures of the other active components.

The release valves (RLVs) 50, one of which is shown in FIG. 4, provide a similar function as the plant automatic depressurization system (ADS) valves attached to the steam lines from the RPV. The valve capacity is about half that of an ADS valve. The RLVs provide a backup depressurization function, and allow RHR-CND 48 to come into use under the conditions of the RHR-HXs 14 becoming unavailable or the suppression pool temperature approaching the safety limit. The manually operated RLVs 50 need to be designed so that the RHR-CND does not exceed its MW capacity or design pressure. The RHR-CND could be used in conjunction with the RPV in its operating pressure range of 50 to 1250 psia.

The RHR-CND is designed primarily for accident control and mitigation. The condenser pool associated with the RHR-CND does not require safety-related pool cooling.

The RHR-CND flow/heat-load is governed by the forced pressure difference between the RPV and the GDCS-LT system. The forced operation feature of the RHR-CND enables it to utilize its full capacity and perform several functions. These functions include: (1) controlled reactor depressurization; (2) backup to the active RHR-HXs in the event of pump failure or high suppression pool temperature; and (3) reactor inventory supply in conjunction with the GDCS-LT.

During accident progression, active systems are the first to initiate, followed by passive systems in the event the active system components fail or as conditions deteriorate. Severe accident features (such as containment venting) are a last resort in the accident progression. The passive systems act as a buffer between the initiation of active systems and severe accident features. Therefore the probability of approaching a severe accident condition, which requires exercising the severe accident features, is greatly reduced.

The passive components included in the fourth division provide multiple backups to the active components covering the BWR safety functions of reactor inventory supply, containment and shutdown cooling, ultimate sink, reactor depressurization and station blackout mitigation. The GDCS-ST and GDCS-LT serve as backups to the LPFL and HPCF/RHVLC for reactor inventory supply. The PCCS and RHR-CND serve as backups to the RHR-HXs for suppression pool/containment cooling. The condenser pool serves as a backup to the ultimate sink. The RLVs serve as backup to the ADS valves for reactor depressurization. The RLVs/GDCS/RHR-CND serve as backup to the RHVLC for station blackout mitigation.

Passive components by their nature require less maintenance than active systems. The addition of a passive fourth division to the three active divisions of the ABWR will have a minimum impact on the ABWR total maintenance activities for the ECCS network. With the passive division, ECCS on-line maintenance can be performed. This would reduce or eliminate the ECCS maintenance activities during outage, with the consequence that the outage is shortened in duration and plant availability is improved.

Maintenance activities on the passive components are much reduced as compared to the maintenance required on active systems. Passive component maintenance mainly involves valve testing, flushing of common injection lines to prevent crud build-up and unplug the line, and ultrasonic inspection of passive heat exchanger tubes.

The addition of a passive fourth division to the three active divisions of the ABWR also provides redundancy and diversity in power supply and component design with the resultant improvement in plant safety. In particular, the passive division meets the BWR design basis requirements with on-line maintenance by providing additional sources of reactor inventory supply (GDCS) and primary containment cooling (PCCS). The passive division also provides additional and diverse severe accident mitigating features. The PCCS stabilizes the containment following core damage. The presence of the PCCS in the PCV with no moving parts would reduce or avoid containment venting. With the PCCS, the conditional containment failure probability will be lower. The GDCS enables lower drywell flooding. The thermalactuated deluge valves open when the temperature rises to a predetermined threshold in the drywell, resulting in emptying of the GDCS tank and filling of the lower drywell cavity surrounding the RPV. The RHR-CND serves to mitigate station blackout and provide back-up to the RHR-HXs with N+2 capability. The passive division also enables classification of the high-pressure active components as non-safety systems. Classifying the high-pressure components of the HPCF and RHVLC as non-safety simplifies plant operation and response to transients.

Limiting the combined active and passive concept to one passive division enables the optimization of the ECCS network, thereby minimizing the number and sizes of the passive components. However, the size of the PCV may need to be increased slightly to compensate for the GDCS tanks and associated piping. Also, the reactor building fueling floor must be rearranged to incorporate the condenser pool. With this in mind, it is expected that the plant initial cost will increase somewhat, with the increase in initial cost being offset at least in part by a decrease in operating maintenance cost.

The foregoing preferred embodiment of the invention has been disclosed for the purpose of illustration. Variations and modifications of the disclosed apparatus will be readily apparent to practitioners skilled in the art of safety systems for BWRs. All such variations and modifications are intended to be encompassed by the claims set forth hereinafter.

We claim:

1. A boiling water reactor comprising:
   a primary containment vessel;
   a reactor pressure vessel surrounded by said primary containment vessel;
   a nuclear fuel core arranged inside said reactor pressure vessel;
   a pool of water located inside said primary containment vessel and outside said reactor pressure vessel;
   a condenser pool of water located outside and above said primary containment vessel;
   a residual heat removal condenser submerged in said condenser pool and having an input and an output;
   a first flowpath from said reactor pressure vessel to said input of said residual heat removal condenser;
   a release valve placed in said first flowpath for selectively opening said first flowpath to the flow of steam from said reactor pressure vessel to said residual heat removal condenser, said release valve being designed to constrict the flow of high-pressure steam from said reactor pressure vessel to said residual heat removal condenser; and
   a second flowpath for carrying condensed steam from said residual heat removal condenser to said pool located inside said primary containment vessel, said second flowpath having an output submerged in said pool located inside said primary containment,
   wherein the operating pressure of said residual heat removal condenser is maintained in the range of 100–200 psi.

2. The boiling water reactor as defined in claim 1, wherein said first flowpath comprises a portion of a main steam line from said reactor pressure vessel.

3. The boiling water reactor as defined in claim 1, wherein said pool located inside said primary containment vessel is a gravity-driven cooling system pool of water located at an elevation above said nuclear fuel core.

4. A boiling water reactor comprising:
   a primary containment vessel;
   a reactor pressure vessel surrounded by said primary containment vessel;
   a nuclear fuel core arranged inside said reactor pressure vessel;
   a suppression pool of water located inside said primary containment vessel and outside said reactor pressure vessel;
   a gravity-driven cooling system pool of water located inside said primary containment vessel and outside said reactor pressure vessel at an elevation above said nuclear fuel core;
   a condenser pool of water located outside and above said primary containment vessel;
   a residual heat removal condenser submerged in said condenser pool and having an input which is not in flow communication with the interior of said primary containment vessel;
   a first flowpath from said reactor pressure vessel to said input of said residual heat removal condenser;
   a release valve placed in said first flowpath for selectively opening said first flowpath to the flow of steam from said reactor pressure vessel to said residual heat removal condenser, said release valve being designed to constrict the flow of high-pressure steam from said reactor pressure vessel to said residual heat removal condenser; and
   a second flowpath for carrying condensed steam from said residual heat removal condenser to said gravity-driven cooling system pool,
   wherein the operating pressure of said residual heat removal condenser is maintained in the range of 100–200 psi.

5. The boiling water reactor as defined in claim 4, wherein said first flowpath comprises a portion of a main steam line from said reactor pressure vessel.

6. The boiling water reactor as defined in claim 4, further comprising a third flowpath for carrying non-condensed gases from said residual heat removal condenser to said suppression pool.

7. The boiling water reactor as defined in claim 6, further comprising a pump for pumping water from said suppression pool to said reactor pressure vessel.

8. The boiling water reactor as defined in claim 6, further comprising:
   a fourth flowpath for carrying water from said suppression pool to said reactor pressure vessel;
   a fifth flowpath for carrying fluid from an ultimate heat sink external to said primary containment vessel and back to the ultimate heat sink;
   means for conducting heat from said water flowing along said fourth flowpath to said fluid flowing along said fifth flowpath; and
   a pump for pumping water from said suppression pool along said fourth flowpath.

9. A boiling water reactor comprising:
   a primary containment vessel;
   a reactor pressure vessel surrounded by said primary containment vessel;
   a nuclear fuel core arranged inside said reactor pressure vessel;
   a pool of water located inside said primary containment vessel and outside said reactor pressure vessel;
   a condenser pool of water located outside and above said primary containment vessel;
   a residual heat removal condenser submerged in said condenser pool and having an input and an output;
   a first flowpath from said reactor pressure vessel to said input of said residual heat removal condenser;
   a release valve placed in said first flowpath for selectively opening said first flowpath to the flow of steam from said reactor pressure vessel to said residual heat removal condenser;
   means for constricting the flow of high-pressure steam from said reactor pressure vessel to said residual heat removal condenser; and
   a second flowpath for carrying condensed steam from said residual heat removal condenser to said pool located inside said primary containment vessel, said second flowpath having an output submerged in said pool located inside said primary containment, wherein the operating pressure of said residual heat removal condenser is maintained in the range of 100–200 psi.

10. The boiling water reactor as defined in claim 9, wherein said constricting means is incorporated in said release valve.

11. The boiling water reactor as defined in claim 9, wherein said first flowpath comprises a portion of a main steam line from said reactor pressure vessel.

12. The boiling water reactor as defined in claim 9, wherein said pool located inside said primary containment vessel is a gravity-driven cooling system pool of water located at an elevation above said nuclear fuel core.

* * * * *